(12) United States Patent
Slabbekoorn et al.

(10) Patent No.: US 8,425,689 B2
(45) Date of Patent: *Apr. 23, 2013

(54) METHOD OF REUSING WASH AND RINSE LIQUID IN A DISHWASHER

(75) Inventors: Scott D. Slabbekoorn, Saint Joseph, MI (US); Elliott V. Stowe, Stevensville, MI (US); Barry E. Tuller, Stevensville, MI (US); Chad T. Vanderroest, Covert, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,798

(22) Filed: Jun. 25, 2012

(65) Prior Publication Data

US 2012/0260942 A1    Oct. 18, 2012

Related U.S. Application Data

(63) Continuation of application No. 13/424,441, filed on Mar. 20, 2012, which is a continuation of application No. 13/170,315, filed on Jun. 28, 2011, now Pat. No. 8,157,923, which is a continuation of application No. 12/941,153, filed on Nov. 8, 2010, now Pat. No. 8,038,802.

(51) Int. Cl.
*B08B 9/20* (2006.01)
*B08B 3/00* (2006.01)

(52) U.S. Cl.
USPC ............................ 134/25.2; 134/34; 134/10

(58) Field of Classification Search .................. 134/34, 134/25.2, 56 D, 57 D
See application file for complete search history.

(56) References Cited

U.S. PATENT DOCUMENTS

| 3,884,263 A | * | 5/1975 | Wright ..................... 137/571 |
| 2008/0092933 A1 | * | 4/2008 | Tameishi et al. ............ 134/133 |

FOREIGN PATENT DOCUMENTS

| EP | 0771898 | * | 5/1997 |
| JP | 5508811 A | * | 12/1978 |
| WO | wo2005039377 | * | 5/2005 |

* cited by examiner

*Primary Examiner* — Eric Golightly
*Assistant Examiner* — Arlyn I Rivera-Cordero
(74) *Attorney, Agent, or Firm* — Jacquelyn R. Lin; McGarry Bair PC

(57) ABSTRACT

A method of operating a dishwasher having a treating chamber for washing utensils includes executing a cycle of operation having at least one liquid supplying phase, removing at least some of the supplied liquid, storing the removed liquid, and later reusing at least some of the stored liquid in the same or subsequent phase or in the same or subsequent cycle of operation.

25 Claims, 5 Drawing Sheets

METHOD OF REUSING WASH AND RINSE LIQUID IN A DISHWASHER

CROSS REFERNCE TO RELATED APPLICATIONS

This application is a continuation of U.S. application Ser. No. 13/424,441, filed Mar. 20, 2012, which is a continuation of U.S. Pat. No. 8,157,923, issued Apr. 17, 2012, which claims the benefit of and is a continuation-in-part of U.S. Pat. No. 8,038,802, issued Oct. 18, 2011, both of which the benefit under 35 U.S.C. 120 is claimed, and all of which are incorporated herein in their entirety.

BACKGROUND OF THE INVENTION

Contemporary dishwashers for use in a typical household include a wash tub for storing utensils during the implementation of a wash cycle within the wash tub for cleaning of the stored utensils. A reuse tank may be provided to store liquid captured from the wash tub during a previous wash/rinse phase of the wash cycle. The stored liquid may be used in the same or subsequent wash cycles.

BRIEF DESCRIPTION OF THE INVENTION

The invention relates to a method of operating a dishwasher having a tub at least partially defining a treating chamber for receiving utensils for washing, which includes executing a cycle of operation having a number of sequential treating phases, supplying liquid to the treating chamber for each of the treating phases, removing a portion of the liquid from at least two of the treating phases and storing the removed portions of liquid in a common reuse tank.

DESCRIPTION OF EMBODIMENTS OF THE INVENTION

The invention is generally directed toward the reuse of liquid in a dishwasher. The particular approach of the invention is to capture liquid from any phase of a wash cycle and store it in a storage vessel for reuse. The stored liquid may be some or all of the liquid used during a particular phase of the wash cycle. It may be taken from one or more phases of a wash cycle, such as a wash phase, where the liquid is a mixture of detergent and water, or a rinse phase, where the liquid is primarily water, with or without a rinsing agent. The liquid may also include entrained particles, such as food soils, which are distributed in the liquid such that particles do not completely flow outside the dishwasher, and may be supplied to the reuse tank. Under such conditions, food soils may be supplied back to a treating chamber in a next wash/rinse phase, which would increase food soil level and degrade the treating efficiency of the wash liquid in the treating chamber. The invention addresses problems associated with the entrained particles in the liquid by selecting a portion of the liquid with a reduced amount of entrained particles.

Figure 1:
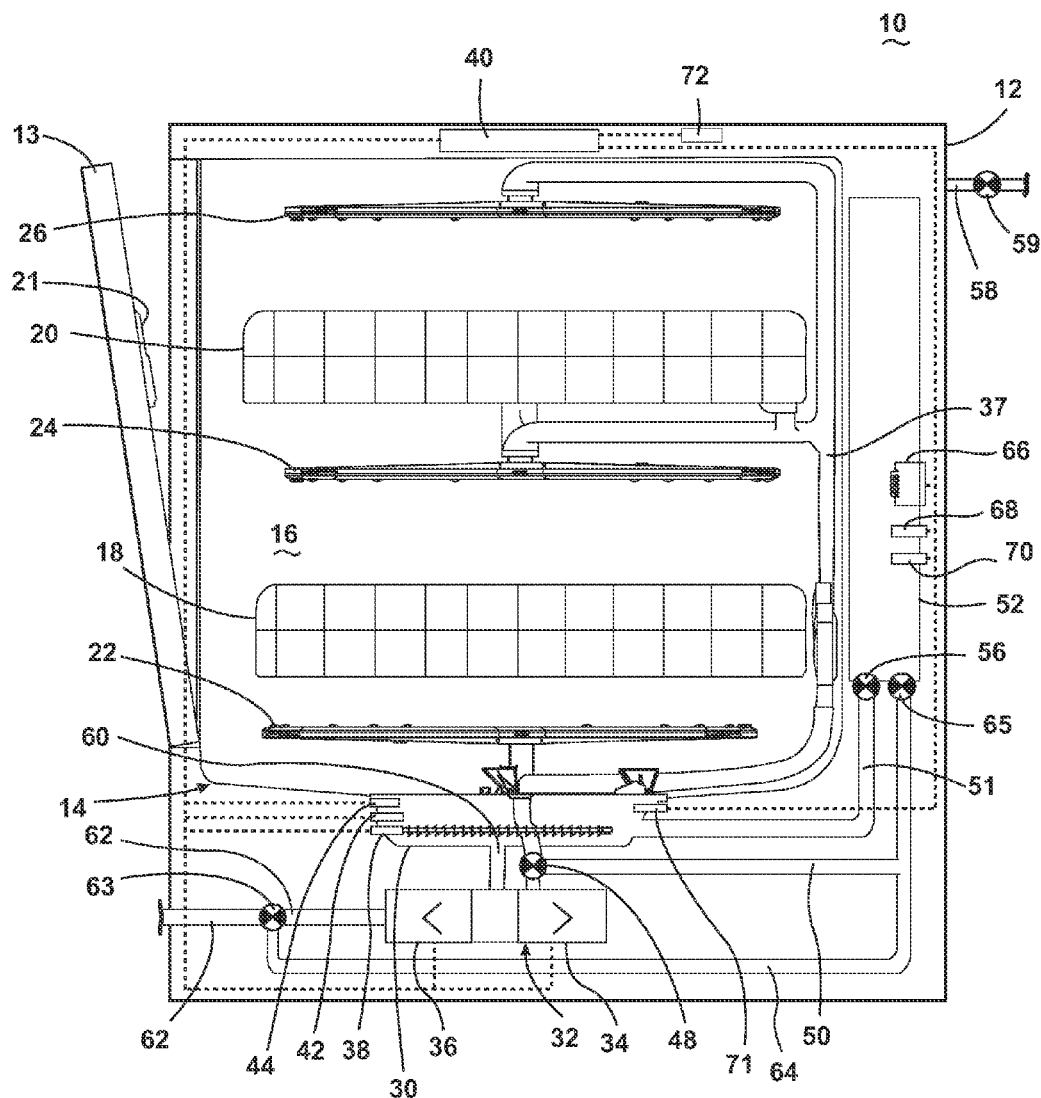
FIG. 1 is a schematic, side view of a dishwasher according to a first embodiment of the invention.

FIG. 1 is a schematic, side view of a treating appliance according to a first embodiment of the invention, which is illustrated in the context of a dishwasher 10. While the illustrated treating appliance is a dishwasher 10, other treating appliances are possible, non-limiting examples of which include other types of dishwashing units, such as in-sink dishwashers, multi-tub dishwashers, or drawer-type dishwashers. The dishwasher 10, which shares many features of a conventional automated dishwasher, will not be described in detail herein except as necessary for a complete understanding of the invention.

The dishwasher 10 may have a cabinet 12 defining an interior, which is accessible through a door 13. The cabinet 12 may comprise a chassis or frame to which panels may be mounted. For built-in dishwashers, the outer panels are typically not needed. At least one wash tub 14 is provided within the interior of the cabinet 12 and defines a treating chamber 16 to receive and treat utensils according to a cycle of operation, often referred to a wash cycle whether or not washing occurs. The wash tub 14 has an open face that is closed by the door 13.

For purposes of this description, the term "utensil(s)" is intended to be generic to any item, single or plural, that may be treated in the dishwasher 10, including, without limitation; dishes, plates, pots, bowls, pans, glassware, and silverware.

One or more utensil racks, such as lower utensil rack 18 and an upper utensil rack 20 may be provided in the treating chamber 16. The racks 18, 20 hold utensils (not shown) that may be treated in the treating chamber 16. The racks 18, 20 may be slid in and out of the treating chamber 16 through the opening closed by the door 13.

A detergent dispenser 21 may be located in the door 13. It will be understood that depending on the type of dishwasher and the type of detergent used, the detergent dispenser 21 may be incorporated into one dispensing mechanism. The detergent dispenser 21 may be of a single use dispenser type or a bulk dispenser type. In the case of bulk dispensing, the detergent and/or rinse aid can be selectively dispensed into the treating chamber 16 in a regulated quantity and at a predetermined time or multiple times during a cycle of operation.

A liquid supply system is provided for supplying liquid to the treating chamber 16 as part of a wash cycle for washing any utensils within the racks 18, 20. The liquid supply system includes one or more liquid sprayers, which are illustrated in the form of spray arm assemblies 22, 24, 26, that are provided within the treating chamber 16 and are oriented relative to the racks 18, 20 such that liquid sprayed from the spray arm assemblies 22, 24, 26 may be directed into one or more of the racks 18, 20.

It should be noted that the stacked arrangement of the utensil racks and the spray arm assemblies is not limiting to the invention. It merely serves to illustrate the invention. For example, the invention may be implemented in a stacked arrangement having a silverware basket, the lower and upper utensil rack, and with upper, middle, and lower level spray arm assemblies having spray heads for the silverware basket alternatively arranged in between the lower and upper utensil rack.

The liquid supply system further comprises a sump 30 to collect by gravity, liquid sprayed within the treating chamber 16. The sump 30 is illustrated as being formed with or affixed to a lower portion of the wash tub 14 to collect liquid that may be supplied into or circulated in the wash tub 14 during, before, or after a cycle of operation. However, the sump 30 may be remote from the wash tub 14 and fluidly coupled by suitable fluid conduits.

The liquid supply system further comprises a pump assembly 32 fluidly coupled to the sump 30, and as illustrated, may include a wash pump 34 and a drain pump 36. The wash pump 34 fluidly couples the sump 30 to the spray arm assemblies 22, 24, 26 through a spray arm supply conduit 37 to recirculate liquid that collects in the sump to the spray arm assemblies 22, 24, 26 for spraying on the racks 18, 20. The drain pump 36 fluidly couples the sump 30 to a drain conduit 62 for draining liquid collected in the sump 30 to a household drain, such as a sewer line, or the like.

The liquid supply system further comprises a reuse tank 52 for storing liquid captured during one or more phases/steps of a wash cycle for later use in the current wash cycle and/or a subsequent wash cycle. The reuse tank 52 may be fluidly coupled to the wash pump 34 by a reuse tank supply conduit 50 so that liquid from the sump 30 may be supplied to the reuse tank 52. A control valve 48 controls the liquid from the wash pump 34 to either the spray arm supply conduit 37 or the reuse tank supply conduit 50. The reuse tank 52 may also be fluidly coupled to the sump 30 by an outlet conduit 51 such that liquid in the reuse tank 52 may be supplied to the sump 30 for subsequent use. A control valve 56 is provided in the outlet conduit 51 to control the supply of liquid from the reuse tank 52 to the sump 30. A supply conduit 64 may fluidly couple the reuse tank 52 to the drain pump 36 through a drain conduit 62 and a control valve 63. A control valve 65 is provided to control the flow of liquid from the drain pump 36 to either the drain conduit 62 or the reuse tank 52.

As illustrated, the physical relationship between the reuse tank 52 and the sump 30 uses gravity to supply the liquid from the reuse tank 52 to the sump 30. Thus, liquid from the sump 30 may be supplied to the reuse tank 52 by either combination of wash pump 34, control valve 56, outlet conduit 51 or drain pump 36, control valve 65, supply conduit 64. With either configuration, the actuation of the corresponding control valve 56, 65 will redirect the output of the wash pump 34 or drain pump 36, respectively, to the reuse tank 52, through the corresponding conduit 50, 64. However, it is contemplated that the reuse tank 52 may be provided at other locations, some of which may be incapable of using gravity to supply the reuse liquid to the sump. Thus, it is contemplated that a pump could be provided to pump liquid from the reuse tank 52 to the sump 30, regardless of whether gravity can be used to supply the reuse liquid.

While liquid may be provided to the reuse tank 52 through the wash tub 14 and the sump 30, the liquid may be directly provided to the reuse tank 52. For example, liquid having at least one of water, detergent, and treatment aid may be separately provided in the reuse tank 52 to form the liquid. Alternatively, premixed mixture having at least one of water, detergent, and treatment aid may be directly provided in the reuse tank 52 to clean the reuse tank 52.

It is noted that the supplying of liquid from the sump 30 to the reuse tank 52 may be reiterated multiple times for the multiple wash/rinse phases of a cycle of operation until multiple capture steps may provide enough amount of liquid which is sufficient to fill up the reuse tank 52 while only one time capturing step during any wash/rinse phase may be performed. It is also noted that whole amount of liquid for any wash/rinse phase during a cycle of operation may be captured to the reuse tank 52 through either the wash pump 34 or drain pump 36 while only a portion of the liquid in the wash tub 14 may be captured and provided to the reuse tank 52.

Further as illustrated, the liquid in the reuse tank 52 may be drained by supplying the liquid to the sump 30 and then actuating the drain pump 36. It is contemplated that a separate drain conduit (not shown) can be provided from the reuse tank 52 to the drain pump 36 to directly drain the liquid in the reuse tank without the liquid entering the sump.

While the pump assembly 32 may include the wash pump 34 and the drain pump 36, in an alternative embodiment, the pump assembly 32 may include a single pump, which may be operated to supply liquid to either the drain conduit 62 or the spray arm support conduit 37, such as by rotating in opposite directions or by valves.

The liquid supply system further comprises a water supply conduit 58 fluidly coupling a water supply to the sump 30. A control valve 59 controls the flow of water from the household supply to the sump 30.

The dishwasher 10 further comprises a control system having various components and sensors for controlling the flow and condition of the liquid to implement a wash cycle. The control system includes a heater 38 that may be located within the sump 30 to selectively heat liquid collected in the sump 30. The heater 38 may be an immersion heater in direct contact with liquid in the sump 30 to provide the liquid with predetermined heat energy. A temperature sensor such as a thermistor 42 may be provided in the sump 30 to provide an output that is indicative of the temperature of any fluid, liquid or air, in the sump 30. A pH sensor 44 may also be located near the bottom of the wall or in the sump 30 and provide an output indicative of the pH of the liquid in the sump 30. A turbidity sensor 71 may also be located in the sump 30, near the bottom of the wall, or near the pump assembly 32 and provide an output that is indicative of the turbidity of the liquid in the sump 30.

The control system may further comprise a heater 66 provided in the reuse tank 52 to heat the liquid in the reuse tank 52. A thermistor 68 may be provided in the reuse tank and output a signal indicative of the temperature within the reuse tank 52. Similar to the heater 38, the heater 66 may also be in a direct fluid contact with liquid in the reuse tank 52 to provide heat energy to the liquid stored in the reuse tank 52. The thermistor 68 may be positioned such that the thermistor 68 may be in direct fluid contact with liquid in the reuse tank 52 during measurement. A pH sensor 70 may be coupled to the reuse tank 52 to output a signal indicative of the pH of liquid in the reuse tank 52. Additional sensors may be operably coupled to the reuse tank to monitor the characteristics of liquid in the reuse tank 52.

It is also noted that additional sensors may be fluidly coupled to the wash tub 14 or reuse tank 52 to provide output indicative of condition of the liquid. Non-limiting examples of additional sensors include a turbidity sensor and a conductivity sensor.

Figure 2:
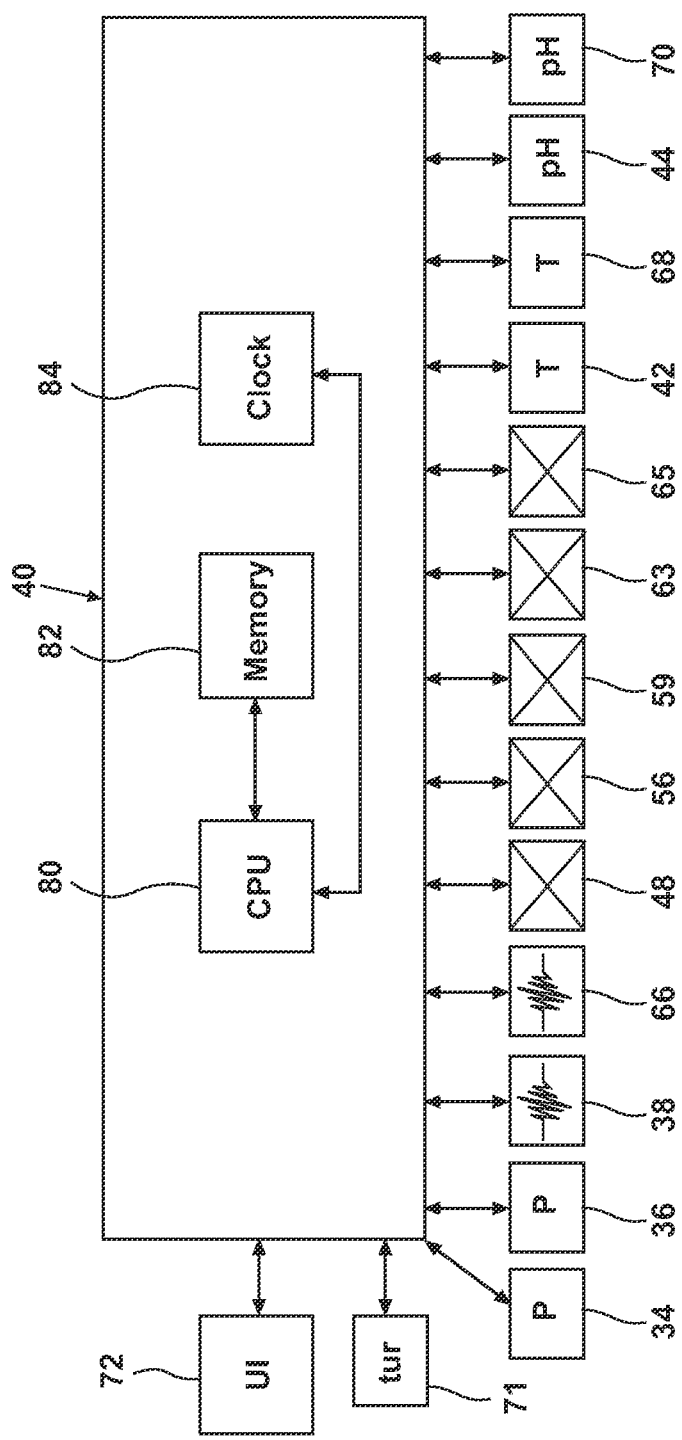
FIG. 2 is a schematic view of a control system of the dishwasher in FIG. 1.

The control system may further comprise a controller 40 for implementing one or more cycles of operation. As seen in FIG. 2, the controller 40 is operably coupled to the pumps 34, 36, heaters 38, 66, control valves 48, 56, 59, 63, 65, thermistors 42, 68, pH sensors 44, 70, and a turbidity sensor 71 to either control these components and/or receive their input for use in controlling the components. The controller 40 is also operably coupled to a user interface 72 to receive input from a user for the implementation of the wash cycle and provide the user with information regarding the wash cycle. In this way, the controller 40 can implement a wash cycle selected by a user according to any options selected by the user and provide related information to the user.

The controller 40 may also comprise a central processing unit (CPU) 80 and an associated memory 82 where various wash cycle and associated data, such as look-up tables, algorithms, may be stored. Non-limiting examples of treatment cycles include normal, light/china, heavy/pots and pans, and rinse only. One or more software applications, such as an arrangement of executable commands/instructions may stored in the memory and executed by the CPU 80 to implement the one or more wash cycles. The controller 40 may further include a clock 84. The clock 84 may be alternatively located in another component operably coupled to the controller 40.

The user interface 72 provided on the dishwasher 10 and coupled to the controller 40 may include operational controls such as dials, lights, knobs, levers, buttons, switches, and displays enabling the user to input commands to the controller 40 and receive information about the selected treatment cycle. The user interface 72 may be used to select a treatment cycle to treat a load of utensils. Alternatively, the treatment cycle may be automatically selected by the controller 40 based on the soil levels sensed by any sensors in the dishwasher 10 to optimize the treatment performance of the dishwasher 10 for a particular load of utensils.

Figure 3:
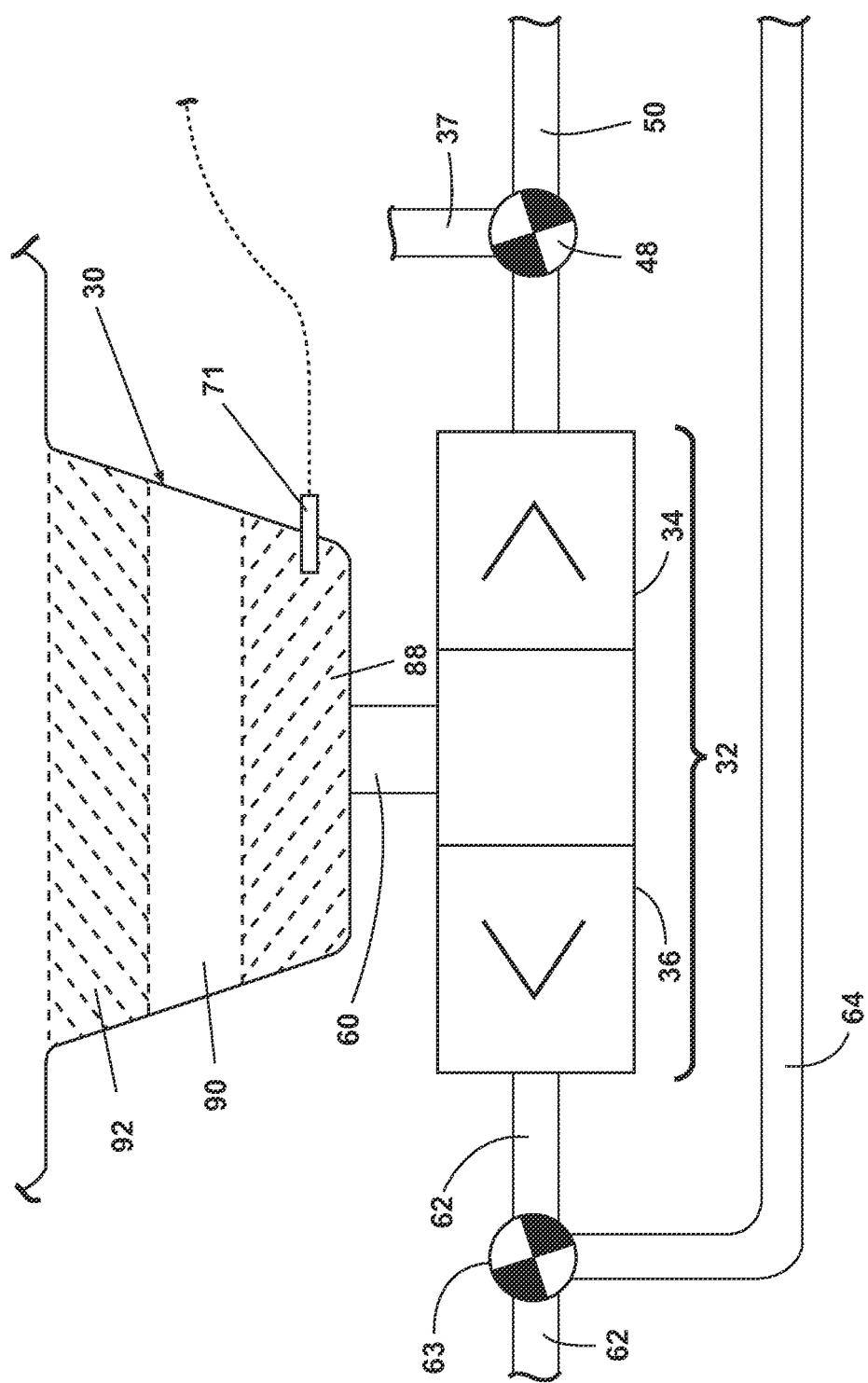
FIG. 3 is an enlarged schematic view of a bottom portion of the dishwasher in FIG. 1, showing liquid in a sump, a reuse tank, and a pump assembly, according to a second embodiment of the invention.

Referring to FIG. 3, the physical phenomena underlying the invention will be described. When recirculation is completed, the wash liquid is drained from the tub 14 and tends to drain sequentially in three portions, which may be differentiated based on the degree and/or type of soiling. These three portions 88, 90, and 92 are schematically illustrated in FIG. 3 as layers for ease of description. In reality, the three portions 88, 90, and 92 do not form finite layers as the liquid may be swirling or moving around as it is drained.

The first portion 88 of the wash liquid predominately includes sedimented particles such as sedimented soil deposit portion, sedimented soil particles/solids, deposited particle/solids, or mixture thereof, which may be typically captured by the filter system (not shown) near to the inlet 60 of the drain pump 36. During the recirculation of the liquid in the treating chamber 16, most of the heavy soils, with a density typically greater than the liquid, will not float nor remain entrained in the liquid, but will collect in the sump 30 and/or at the filter to the wash pump 34, which is in close proximity to the inlet 60 to the drain pump 36. Thus, when draining is initiated, the close proximity of these heavy soils to the drain pump 36 and their tendency to remain as sediments results in the removal of these soils upon the initiating of the draining. Non-limiting examples of the sedimented particles/solids include vegetable, grain, flour dough, or any viscous or gel type food. The second portion 90 predominately includes recirculated wash liquid that contains particles small enough to pass through the filter system and is considered the "cleanest", most soil-free, portion of the wash liquid. The third portion 92 includes lighter soils that may float or easily remain in suspension with the wash liquid. It may also include fine silt that is very slow to drain and may not have ever passed through the filter during recirculation. Non-limiting examples of the third portion 92 include oil portion, shell bits, husks, or foreign materials such as small piece of plastics.

The second portion 90 is the preferred portion to capture to the reuse tank 52 because of its relatively low soil content. The low soil content reduces the likelihood that micro-organisms will grow while the liquid is stored in the reuse tank 52. The low soil content also provides cleaner water, capable of greater capacity for carrying more soil from subsequent wash phases or wash cycles.

However, while the second portion 90 with the lightest soil level is the preferred portion to capture for reuse, its collection can be quite difficult without also collecting some of the first and third portions 88, 92, having more soils than the second portion 90. For example, the volume of liquid being drained is not always consistent. The ratio of the portions to the entire volume and to each other is not always consistent. The amount and type of each of the soils forming each portion may also vary, leading to further variation in the volume of each portion. Thus, it is not always possible to know with certainty the amount of each portion, including the type and amount of soil in each portion.

One solution to capturing the second portion 90 is to run the drain pump 36 until the first portion 88 is drained away through the drain conduit 62. As the second portion 90 is being drained, the output of the drain pump 36 is diverted by the control valve 63 to the reuse tank 52. Upon the draining of the third portion 92, the output of the drain pump 36 is diverted back to the drain conduit 62. During this draining procedure the wash pump 34 may be simultaneously run to ensure that the wash liquid is forced to the drain pump 36.

The difficulty with this approach is determining when the draining transitions through the different portions. Two possibilities for determining the transitions are time-based and turbidity/opacity. The time it takes for the portions to drain can be anecdotally determined and stored in the controller 40. Similarly, turbidity ranges or values for the different portions may be determined and stored in the controller 40. With this information, it is possible to determine the transition between the different portions.

In the time-based approach, the second portion 90 may be captured using the drain pump 36 to divert and maintain the output direction for predetermined time periods, in a similar way described above. For example, the drain pump 36 may be run for a first time period that is sufficient to drain the first portion 88 via the drain conduit 62. While the drain pump 36 continues to run, the output of the drain pump 36 is diverted to the reuse tank 52 for a second time period sufficient to collect the second portion 90. After the passing of the second time period, the output of the drain pump 36 is diverted from the reuse tank 52 back to the drain line 62. The third portion 92 is then drained for a third time period.

While the predetermined time periods may be empirically determined based on anticipated liquid volumes and soil conditions, this approach runs the risk of under/over-shooting each of the portions if the volumes and soil conditions vary from what was anticipated or for some reason the pump does not pump at the anticipated rate. An adjustment factor may be introduced in determining the time period to ensure capturing of only the second portion 90. For example, a capture time shorter than the time to drain the entire second portion 90 may be determined. Also, the capturing would be delayed until it was safely within the draining of the second portion 90. While this would result in not all of the second portion 90 being captured, it would ensure that only the second portion 90 is captured.

Alternatively, the turbidity/optical sensors may be used to determine the transitions between portions and operate the drain pump 36 and capturing a desired portion accordingly. The turbidity sensor 71 may be placed relative to the drain pump inlet 60 or may be in the drain pump outlet near the control valve (diverter) 63. The turbidity/opacity may be monitored during draining and compared to the predetermined values, which may be ranges, for each of the portions 88, 90, 92. When the turbidity/opacity values indicate that a transition between portions is present, then the output of the drain pump 36 may be redirected between the drain conduit 62 and the reuse tank 52 to capture only liquid from the second portion 90.

While the capturing has been described in terms of using the drain pump 36, it is within the scope of the invention for the wash pump 34 to be used to capture. The same approaches described for the drain pump 36 may be used for the wash pump 34, with variations as needed to accommodate the use of the wash pump 34. For example, if it is desired to drain away the first and third portions 88, 92, the drain pump 36 may be used to drain away the first portion 88. When the first time period passes or turbidity indicates the second portion 90 is present, the drain pump 36 is shut off while the wash pump 34 is turned on and the control valve 48 is opened to direct the second portion 90 to the reuse tank 52 through the supply conduit 50. When the second time period passes or the turbidity indicates the third portion 92 is present, the wash pump 34 is shut off and the drain pump 36 is turned on for the third time period to drain away the third portion 92.

In some circumstances, it may be possible to use both the wash pump 34 and drain pump 36. In this scenario, both the wash pump 34 and drain pump 36 may operate at the same time. First, the first portion 88 may be drained through the drain pump 36 until the passing of the first time period or the turbidity indicates the presence of the second portion 90. At that time the control valve 48 is actuated to direct the flow of liquid from the wash pump 34 to the reuse tank 52 to capture the second portion 90. Upon the passage of the second time period or the turbidity indicates the presence of the third portion 92, the control valve 48 may direct the flow of liquid from the reuse tank 52 to the treating chamber 16 until the third portion 92 is drained.

Figure 4:
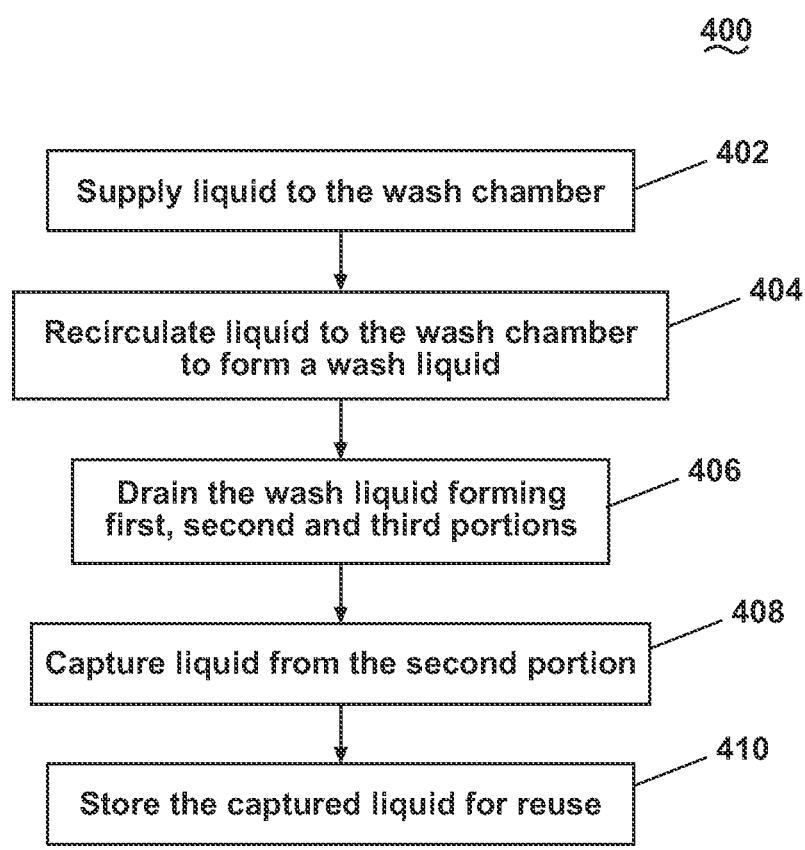
FIG. 4 is a flow chart of the operation of the dishwasher according to a third embodiment of the invention.

FIG. 4 is a flow chart of the operation of the dishwasher 10 according to a third embodiment of the invention. The third embodiment provides for capturing the second portion 90 to the reuse tank 52 to use the second portion 90 in the same or subsequent wash cycle. The sequence of steps depicted in FIG. 4 is for illustrative purposes only, and is not meant to limit the method in any way as it is understood that the steps may proceed in a different logical order, additional or intervening steps may be included, or described steps may be divided into multiple steps, without detracting from the invention. The method may be implemented multiple times, either consecutively or intermittently, during, after or before a wash cycle. The method may be incorporated into a cycle of operation for the dishwasher 10, such as prior to or as part of any phase of the wash cycle, such as a wash phase, rinse phase, and drying phase. The method may also be a stand-alone cycle. It is noted that the method may be used with or without the utensils placed within the treating chamber 16.

The method 400 may begin at 402 by supplying liquid to the treating chamber 16. The liquid may be directly provided to the treating chamber 16 by providing water to the sump 30 in combination with a treating chemistry, such as detergent. Alternatively, water and the treating chemistry may be pre-mixed before the mixture of water and the treating chemistry is provided to the treating chamber 16. When the liquid is supplied to the treating chamber 16, the liquid may be collected in the sump 30 due to gravity.

At 404, the liquid may be recirculated in the treating chamber 16 to form a wash liquid. The liquid in the sump 30 may be recirculated through the spray arm supply conduit 37 to at least one of the spray arm assemblies 22, 24, 26 to provide a spray of liquid to clean the utensils in the utensil racks 18, 20 in the treating chamber 16 according to a wash cycle. Alternatively, the liquid may recirculate in the treating chamber 16 through the spray arm supply conduit 37 without the presence of utensils inside the treating chamber 16, to remove any micro-organisms in the spray arm supply conduit 37 and/or the treating chamber 16, or to clean any remaining food soil in the treating chamber 16 that may have left from the previous wash cycle.

At 406, when the recirculation ceases, the wash liquid having food soils, stains or other impurities may drain from the lower portion of the sump 30, sequentially in three portions: first 88, second 90, and third 92. The liquid is drained from the sump 30 by the drain pump 36, with the control valve 63 actuated to direct the output of the drain pump 36 down the drain conduit 62.

At 408, all or part of the second portion 90 is captured from the draining liquid of 406. The capturing is accomplished by directing the output of the drain pump 36 to the supply conduit 64 feeding the reuse tank 52 by the actuation of the control valve 63 until all or a part of the second portion 90 is captured. After which, the valve 63 is actuated again to direct the output of the drain pump 36 back to the drain conduit 62, so that the remaining liquid may be drained. The timing of the actuation of the control valve 63 may be based on either of the previously described time-based or turbidity/opacity methods.

At 410, the liquid captured in 408 may be provided to the reuse tank 52 for storage, and all or a portion of the liquid stored in the reuse tank 52 may be used in the same or subsequent cycles of operation. The stored liquid may be supplied back to the treating chamber 16 by gravity using outlet conduit 51 and control valve 56.

Figure 5:
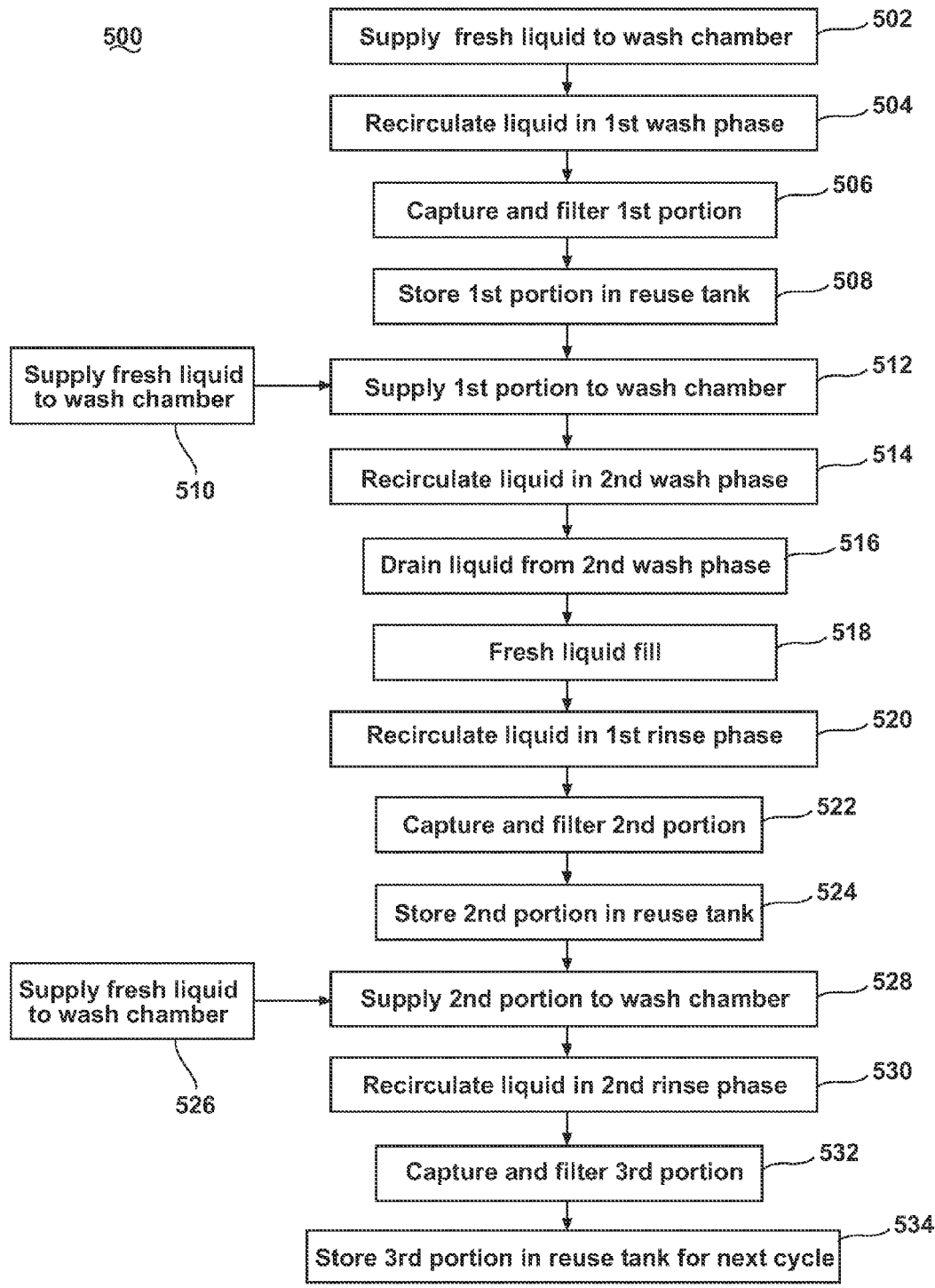
FIG. 5 is a flow chart of the operation of the dishwasher according to a fourth embodiment of the invention.

FIG. 5 is a flow chart of the operation of the dishwasher 10 according to a fourth embodiment of the invention. The fourth embodiment of the invention provides for reusing water throughout an entire dishwashing cycle to increase the total amount of water savings. Basically, water is captured and stored for subsequent reuse in at least three different steps within a cycle. The water is preferably filtered prior to entering the reuse tank 52, so that water can be re-used throughout the cycle to increase the amount of water savings. Preferable filtration and dilution of the water enable maintaining acceptable wash performance. This water can be used in the subsequent fill and mixed with fresh water to meet the fill volume requirements. This process can be used multiple times within the latest cycle while still meeting wash performance requirements.

An exemplary flowchart is shown in FIG. 5. The sequence of steps depicted in FIG. 5 is for illustrative purposes only, and is not meant to limit the method in any way as it is understood that the steps may proceed in a different logical order, additional or intervening steps may be included, or described steps may be divided into multiple steps, without detracting from the invention. The method may be implemented multiple times, either consecutively or intermittently, during, after or before a wash cycle. The method may be incorporated into a cycle of operation for the dishwasher 10, such as prior to or as part of any phase of the wash cycle, such as a wash phase, rinse phase, and drying phase. The method may also be a stand-alone cycle. It is noted that the method may be used with or without the utensils placed within the treating chamber 16.

The method 500 may begin at 502 by supplying fresh liquid to the treating chamber 16 for a first fill. The liquid may be directly provided to the treating chamber 16 by providing water to the sump 30 in combination with a treating chemistry, such as detergent. Alternatively, water and the treating chemistry may be pre-mixed before the mixture of water and the treating chemistry is provided to the treating chamber 16. When the liquid is supplied to the treating chamber 16, the liquid may be collected in the sump 30 due to gravity. In the illustrated embodiment, the volume of the fresh liquid in the first fill is 3.9 liters. Alternatively, the first fill at 502 can comprise a mixture of fresh liquid and reuse liquid from the reuse tank 52 from a prior cycle, for example, 2.5 liters of reuse liquid and 1.4 liters of fresh liquid. The fresh liquid and/or the reuse liquid can include treating chemistry.

At 504, the liquid may be recirculated in the treating chamber 16 in a first wash phase. The liquid in the sump 30 may be recirculated through the spray arm supply conduit 37 to at least one of the spray arm assemblies 22, 24, 26 to provide a spray of liquid to clean the utensils in the utensil racks 18, 20 in the treating chamber 16 according to a wash cycle. Alternatively, the liquid may recirculate in the treating chamber 16 through the spray arm supply conduit 37 without the presence of utensils inside the treating chamber 16, to remove any micro-organisms in the spray arm supply conduit 37 and/or the treating chamber 16, or to clean any remaining food soil in the treating chamber 16 that may have left from the previous wash cycle.

At 506, when the recirculation ceases, the wash liquid having food soils, stains or other impurities may drain from the lower portion of the sump 30 by the drain pump 36, with the control valve 63 actuated to direct the output of the drain pump 36 down the drain conduit 62. A first portion is captured from the draining liquid of 506 by directing the output of the drain pump 36 to the supply conduit 64 feeding the reuse tank 52 by the actuation of the control valve 63 until a designated amount for the first portion is captured, after which, the valve 63 is actuated again to direct the output of the drain pump 36 back to the drain conduit 62, so that most of the remaining liquid may be drained. Preferably some liquid, e.g. 0.5 liters, remains in the treating chamber 16 for wetting the dishes and the tub. The timing of the actuation of the control valve 63 may be based on either of the previously described time-based or turbidity/opacity methods. Preferably, the first portion is not sedimented as in the third embodiment, but simply extracted from the drain liquid for direction to the reuse tank 56. Preferably, the first portion is filtered by the filter system before entering the reuse tank.

At 508, the filtered, first portion is stored in the reuse tank for later reuse within the wash cycle. All or some of the first portion may be supplied back to the treating chamber 16 by gravity using outlet conduit 51 and control valve 56 when directed by the controller 40. In the illustrated embodiment, the volume of the stored first portion is 2.6 liters.

A second fill commences with supplying fresh liquid at 510 and the first portion from the reuse tank 56 at 512 to the treating chamber 16. In the illustrated embodiment, the volume of the fresh liquid for the second fill is 0.7 liters and the stored first portion is 2.6 liters for a total second fill of 3.3 liters. Recall that about 0.5 liters remains in the treating chamber from the first fill.

At 514, the liquid may be recirculated in the treating chamber 16 in a second wash phase as directed by the controller 40. Additional heating can be applied, for example. At 516, substantially all of the liquid may be drained from the treating chamber in preparation for a first rinse. A third fill commences with supplying fresh liquid for a short first rinse at 518. In the illustrated embodiment, the volume of the fresh liquid for the third fill is 2.1 liters. At 520, the liquid may be recirculated in the treating chamber 16 in a first short rinse as directed by the controller 40.

At 522, when the short rinse ceases, the rinse liquid may drain from the lower portion of the sump 30 by the drain pump 36, with the control valve 63 actuated to direct the output of the drain pump 36 down the drain conduit 62. A second portion is captured from the draining liquid of 518 by directing the output of the drain pump 36 to the supply conduit 64 feeding the reuse tank 52 by the actuation of the control valve 63 until a designated amount for the second portion is captured, after which, the valve 63 is actuated again to direct the output of the drain pump 36 back to the drain conduit 62, so that most of the remaining liquid may be drained. Preferably, the second portion is filtered by the filter system before entering the reuse tank.

At 524, the filtered, second portion is stored in the reuse tank for later reuse within the wash cycle. All or some of the second portion may be supplied back to the treating chamber 16 by gravity using outlet conduit 51 and control valve 56 when directed by the controller 40. In the illustrated embodiment, the volume of the stored second portion is 1.3 liters.

A fourth fill commences with supplying fresh liquid at 526 and the second portion from the reuse tank 56 at 528 to the treating chamber 16. In the illustrated embodiment, the volume of the fresh liquid for the fourth fill is 2.1 liters and the stored second portion is 1.3 liters for a total fourth fill of about 3.4 liters. At 530, the liquid may be recirculated in the treating chamber 16 in a second longer rinse as directed by the controller 40. Heat may also be applied to the rinse water.

At 532, when the second longer rinse ceases, the rinse liquid may drain from the lower portion of the sump 30 by the drain pump 36, with the control valve 63 actuated to direct the output of the drain pump 36 down the drain conduit 62. At 534, a third portion is captured from the draining liquid by directing the output of the drain pump 36 to the supply conduit 64 feeding the reuse tank 52 by the actuation of the control valve 63 until a designated amount for the third portion is captured, after which, the valve 63 is actuated again to direct the output of the drain pump 36 back to the drain conduit 62, so that most of the remaining liquid may be drained. Preferably, the third portion is filtered by the filter system before entering the reuse tank. In the illustrated embodiment, the volume of the stored third portion is 2.5 liters, available for use in a subsequent cycle. It will be seen that the total amount of liquid saved for reuse in this embodiment is about 6.4 liters.

The invention described herein provides methods for operating a dishwasher 10 fluidly coupled to a reuse tank 52. The methods of the invention can advantageously be used when the user may need to save water or any other liquid resources provided to the dishwasher 10 for the subsequent wash/rinse step in the present or next wash cycle. The possibility of selectively capturing a portion of the wash liquid having fewer food soil and low turbidity can be maximized by inputting predetermined times either manually or using one or more software programs and/or look-up tables, or monitoring the output reading of the sensors such as the turbidity sensor or UV-Vis spectrometer. Further, by selectively capturing the portion having fewer food soil and lower turbidity in the reuse tank 52, the possibility that extra contaminants such as food soil can be incorporated into the next wash phase would be greatly minimized when the selectively captured portion in the wash liquid is used in the next wash cycle.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of operating a dishwasher having a tub at least partially defining a treating chamber for receiving utensils for washing, the method comprising:

executing a cycle of operation having at least three sequential treating phases;

supplying liquid to the treating chamber for each of the treating phases;

removing a portion of the liquid from at least two of the treating phases; and storing the removed portions of liquid in a common reuse tank to mix the removed portions for subsequent use in another of the sequential treating phases or in another cycle of operation;

wherein the sequential treating phases include at least two wash phases and at least two rinse phases; and wherein a first wash phase includes all fresh liquid and no portion from the common reuse tank, a second wash phase includes fresh liquid and a first portion from the common reuse tank, a first rinse phase includes all fresh liquid and no portion from the common reuse tank, and a second rinse phase includes fresh liquid and a second portion from the common reuse tank with less volume than the first portion.

2. The method of claim 1 wherein the removed portions of the liquid are filtered prior to the storing step.

3. The method of claim 1 wherein subsequent use includes mixing fresh liquid with the removed portion in the supplying step.

4. The method of claim 1 wherein the capacity of the common reuse tank is less than the liquid supplied to the treating chamber.

5. The method of claim 1 wherein the removed portions differ in volume.

6. The method of claim 1 wherein the sequential treating phases include at least one wash phase and at least two rinse phases.

7. The method of claim 1 wherein removing the liquid comprises draining the liquid from the treating chamber.

8. The method of claim 1 wherein removing the liquid includes removing the liquid from the treating chamber in sequential portions comprising a first portion primarily containing sedimented soil particles, a second portion primarily containing entrained soil particles, and a third portion primarily containing suspended soil particles, and storing only the second portion.

9. The method of claim 1 wherein removing the liquid comprises removing a first portion of the liquid that primarily contains sedimented soil particles for a first time period, and after the first time period, removing a second portion of the liquid that primarily contains entrained soil particles for a second time period.

10. The method of claim 1 wherein a third portion is stored in the common reuse tank from the second rinse phase for use in a first wash phase of a subsequent cycle of operation.

11. The method of claim 10 wherein the volume of the first portion is about 2.6 liters, the volume of the second portion is about 1.3 liters, and the volume of the third portion is about 2.5 liters whereby in a single cycle of operation about 6.4 liters of liquid is captured for reuse.

12. A method of operating a dishwasher having a tub at least partially defining a treating chamber for receiving utensils for washing, the method comprising:

executing a cycle of operation having at least three sequential treating phases;

supplying liquid to the treating chamber for each of the treating phases;

removing a portion of the liquid from at least two of the treating phases; and storing the removed portions of liquid in a common reuse tank to mix the removed portions for subsequent use in another of the sequential treating phases or in another cycle of operation;

wherein the sequential treating phases include at least two wash phases and at least two rinse phases; and wherein a first wash phase includes fresh liquid and a first portion from the common reuse tank, a second wash phase includes fresh liquid and a second portion from the common reuse tank, a first rinse phase includes all fresh liquid and no portion from the common reuse tank, and a second rinse phase includes fresh liquid and a third portion from the common reuse tank with less volume than the second portion.

13. A method of operating a dishwasher having a tub at least partially defining a treating chamber for receiving utensils for washing, the method comprising:

executing a cycle of operation having at least three sequential treating phases;

supplying liquid to the treating chamber for each of the treating phases;

removing a portion of the liquid from at least two of the treating phases; and storing the removed portions of liquid in a common reuse tank to mix the removed portions for subsequent use in another of the sequential treating phases or in another cycle of operation;

wherein removing the liquid includes removing the liquid from the treating chamber in sequential portions comprising a first portion primarily containing sedimented soil particles, a second portion primarily containing entrained soil particles, and a third portion primarily containing suspended soil particles, and string only the second portion.

14. The method of claim 13 wherein the removed portions of the liquid are filtered prior to the storing step.

15. The new method of claim 13 wherein subsequent use includes mixing fresh liquid with the removed portion in the supplying step.

16. The method of claim 13 wherein the capacity of the common reuse tank is less than the liquid supplied to the treating chamber.

17. The method of claim 13 wherein the removed portions differ in volume.

18. The method of claim 13 wherein the sequential treating phases include at least one wash phase and at least two rinse phases.

19. The method of claim 13 wherein the sequential treating phases include at least two wash phases and at least two rinses phases.

20. The method of claim 19 wherein a first wash phase includes all fresh liquid and no portion from the common reuse tank, a second wash phase includes fresh liquid and a first portion from the common reuse tank, a first rinse phase includes all fresh liquid and no portion from the common reuse tank, and a second rinse phase includes fresh liquid and a second portion from the common reuse tank with less volume than the first portion.

21. The method of claim 19 wherein a first wash phase includes fresh liquid and a first portion from the common reuse tank, a second wash phase includes fresh liquid and a second portion from the common reuse tank, a first rinse phase includes all fresh liquid and no portion from the common reuse tank, and a second rinse phase includes fresh liquid and a third portion from the common reuse tank with less volume than the second portion.

22. The method of claim 13 wherein a third portion is stored in the common reuse tank from a second rinse phase for use in a first wash phase of a subsequent cycle of operation.

23. The method of claim 22 wherein the volume of the first portion is about 2.6 liters, the volume of the second portion is about 1.3 liters, and the volume of the third portion is about 2.5 liters whereby in a single cycle of operation about 6.4 liters of liquid is captured for reuse.

24. The method of claim 13 wherein removing the liquid comprises draining the liquid from the treating chamber.

25. The method of claim 13 wherein removing the liquid comprises removing a first portion of the liquid that primarily contains sedimented soil particles for a first time period, and after the first time period, removing a second portion of the liquid that primarily contains entrained soil particles for a second time period.

* * * * *